(12) United States Patent
Fan

(10) Patent No.: US 12,430,234 B2
(45) Date of Patent: Sep. 30, 2025

(54) DYNAMIC TEST CASE EXECUTION SCHEDULING MECHANISM

(71) Applicant: Dell Products L.P., Round Rock, TX (US)

(72) Inventor: Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 268 days.

(21) Appl. No.: 18/129,939

(22) Filed: Apr. 3, 2023

(65) Prior Publication Data

US 2024/0012744 A1   Jan. 11, 2024

(30) Foreign Application Priority Data

Jul. 7, 2022 (CN) .......................... 202210803842.5

(51) Int. Cl.
*G06F 11/36* (2025.01)
*G06F 11/3668* (2025.01)

(52) U.S. Cl.
CPC ...... *G06F 11/3688* (2013.01); *G06F 11/3692* (2013.01)

(58) Field of Classification Search
None
See application file for complete search history.

(56) References Cited

U.S. PATENT DOCUMENTS

| 2014/0245264 A1* | 8/2014 | Bartley | G06F 11/3688 |
| | | | 717/124 |
| 2018/0260314 A1* | 9/2018 | Singi | G06F 16/9024 |
| 2021/0067366 A1* | 3/2021 | Silverstein | H04L 43/50 |
| 2022/0091967 A1* | 3/2022 | Wang | G06F 11/3684 |

FOREIGN PATENT DOCUMENTS

| CN | 111639025 B | * | 8/2022 | ......... G06F 11/3672 |
| CN | 111367790 B | * | 5/2023 | ......... G06F 11/3684 |

* cited by examiner

*Primary Examiner* — Philip Wang
(74) *Attorney, Agent, or Firm* — Krishnendu Gupta; Lesley Leonessa

(57) ABSTRACT

Methods, system, and non-transitory processor-readable storage medium for a test case execution system are provided herein. An example method includes selecting an unexecuted test case from a plurality of test cases in a software testing lifecycle system. The test case execution system calculates a weighted metric associated with a tester for each tester in a plurality of testers. Using the weighted metric, the test case execution system determines a tester to which to assign the unexecuted test case for execution, where a tester is associated with a tester system, and assigns the unexecuted test case to the tester. The test case execution system receives results associated with executing the unexecuted test case on the tester system resulting in an executed test case. The test case execution system determines a test case execution value for the executed test case based on test failures associated with the executed test case.

20 Claims, 4 Drawing Sheets

DYNAMIC TEST CASE EXECUTION SCHEDULING MECHANISM

FIELD

The field relates generally to optimizing test coverage, and more particularly to optimizing test coverage in information processing systems.

BACKGROUND

Customers demand high quality software, and adequate test coverage is one component of software quality. Comprehensive and balanced test coverage of software, therefore, is critical to the success of a software project.

SUMMARY

Illustrative embodiments provide techniques for implementing a test case execution system in a storage system. For example, illustrative embodiments select an unexecuted test case from a plurality of test cases in a software testing lifecycle system. The test case execution system calculates a weighted metric associated with a tester for each tester in a plurality of testers. Using the weighted metric, the test case execution system determines a tester to which to assign the unexecuted test case for execution, where a tester is associated with a tester system. The test case execution system assigns the unexecuted test case to the tester. The test case execution system receives results associated with executing the unexecuted test case on the tester system resulting in an executed test case. The test case execution system determines a test case execution value for the executed test case based on test failures associated with the executed test case. Other types of processing devices can be used in other embodiments. These and other illustrative embodiments include, without limitation, apparatus, systems, methods and processor-readable storage media.

DETAILED DESCRIPTION

Figure 1:
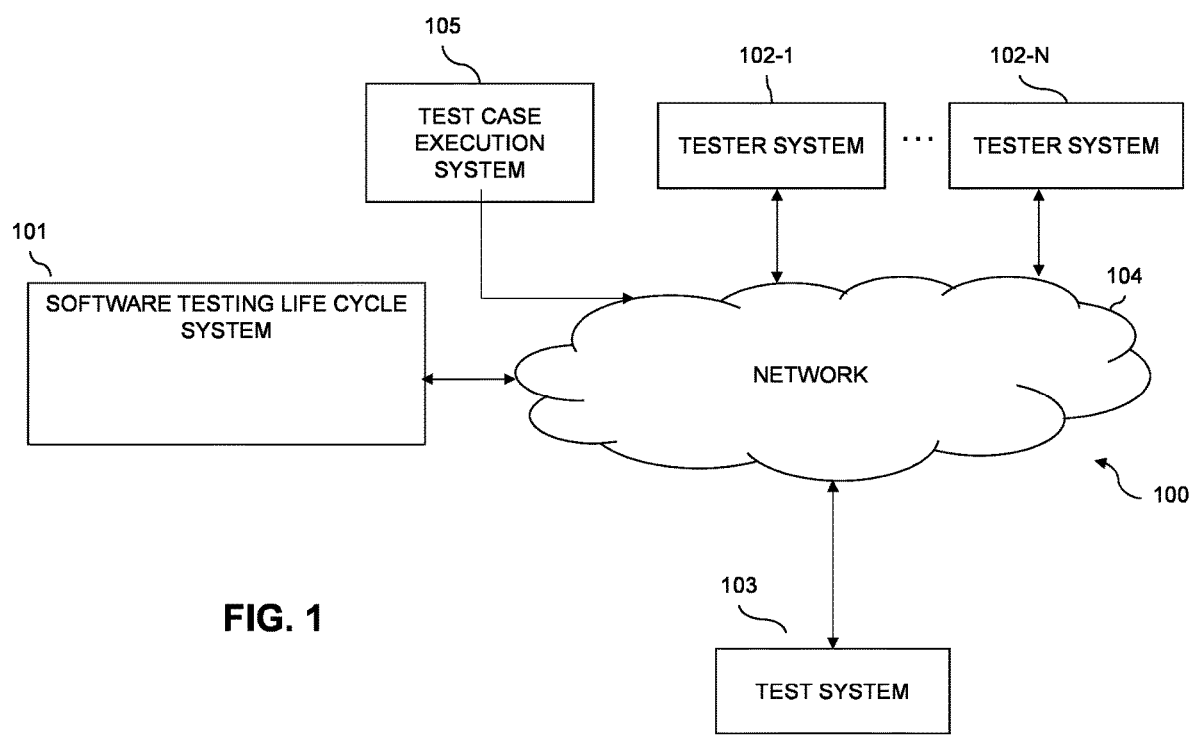
FIG. 1 shows an information processing system including a test case execution system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a test case execution system, which technique may be used to provide, among other things, test case scheduling optimization to balance test feature coverage by selecting an unexecuted test case from a plurality of test cases in a software testing lifecycle system. The test case execution system calculates a weighted metric associated with a tester for each tester in a plurality of testers. Using the weighted metric, the test case execution system determines a tester to which to assign the unexecuted test case for execution, where a tester is associated with a tester system. The test case execution system assigns the unexecuted test case to the tester. The test case execution system receives results associated with executing the unexecuted test case on the tester system resulting in an executed test case. The test case execution system determines a test case execution value for the executed test case based on test failures associated with the executed test case.

The productivity of software development processes is constantly rising as customers demand higher and higher quality. In today's rapid iteration and agile testing mode, to maximize test coverage, many test cases are often scheduled to be executed in a short test cycle. A good test case execution scheduling mechanism has skilled engineers/testers thoroughly testing the product to find failures/bugs/defects as early in the test cycle as possible so as to deliver a quality product to the customer on time.

The software testing life cycle (STLC) is a sequence of activities that occur during software testing. An important phase of STLC and the entire software development process is test case execution. An important aspect of test case execution is having a test case assignment and scheduling mechanism that assigns test cases to test cycles to thoroughly test the product from different angles and locate possible product defects/test failures/bugs as early as possible. Early detection is important so that issues can be addressed earlier in the STLC, and fixes can be verified in later test cycles. There may be hundreds of test cases per test domain and thousands of test cases for testing a product/system. For example, there may be 30 to 50 engineers responsible for executing 1000s of test cases.

Conventional technologies for assigning test cases to test cycles within a STLC system may statically assign test cases for execution to testers/engineers in the pre-plan stage of testing, where the test cases are executed in a random sequence during the testing phase. Conventional technologies do not dynamically schedule execution of test cases that have the potential to generate critical failures/bugs earlier in the testing phase. Conventional technologies do not analyze executed test cases to dynamically evaluate the value of unexecuted test cases. Conventional technologies do not improve the overall testing of the product by identifying cross-feature test cases in a real-time testing framework. Conventional technologies do not dynamically match test case execution to a tester's workload. Conventional technologies cannot match the engineer's/tester's real-time workload with a variable task assignment environment, especially when there are other high-priority tasks inserted during the test execution cycle. Conventional technologies cannot dynamically evaluate the available testers' degree of expertise with respect to the unexecuted test cases. Conventional technologies do not provide a system for scheduling unexecuted test cases and assigning them to testers in an environment where the workload may change dynamically based on failures/bugs that occur during testing, or customer issues that arise. Conventional technologies do not evaluate both the tester's workload and the tester's expertise to ensure that highly skilled testers are available to schedule execution of complex test cases.

By contrast, in at least some implementations in accordance with the current technique as described herein, test case scheduling is optimized by selecting an unexecuted test case from a plurality of test cases in a software testing lifecycle system. The test case execution system calculates a weighted metric associated with a tester for each tester in a plurality of testers. Using the weighted metric, the test case execution system determines a tester to which to assign the unexecuted test case for execution, where a tester is associated with a tester system. The test case execution system assigns the unexecuted test case to the tester. The test case execution system receives results associated with executing the unexecuted test case on the tester system resulting in an executed test case. The test case execution system determines a test case execution value for the executed test case based on test failures associated with the executed test case. The test case execution system takes multiple factors into account such as the unexecuted test case's priority attribute, the unexecuted test case's value in detecting failures/bugs, the unexecuted test case's configuration similarity to executed test cases, the tester's real-time workload, and the tester's expertise with respect to unexecuted test cases.

Thus, a goal of the current technique is to provide a method and a system for providing a test case execution system that can assign test cases to testers to achieve optimal balance. Another goal is to dynamically predict the value of unexecuted test cases by learning from executed test cases based on test case similarity and the failures detected by the executed test cases. Another goal is to maximize the effectiveness and efficiency of the test cases (i.e., for example, by finding test failures/bugs earlier in the testing process to provide a remedy and then re-test) to provide a better, more robust product for the customer. Another goal is to assign test cases with a higher priority as early in a test cycle as possible. Another goal is to identify unexecuted test cases that have similarity with high value executed test cases so as to identify high quality product failures/bugs as early in the testing process as possible. Another goal is to achieve a balanced workload among testers. Another goal is to evaluate the current workload of testers and their expertise to determine the optimal tester to execute the selected unexecuted test case.

In at least some implementations in accordance with the current technique described herein, the use of a test case execution system can provide one or more of the following advantages: provide optimal balance when assigning test cases to testers, dynamically scheduling execution of test cases that have the potential to generate critical failures/bugs earlier in the testing phase, analyze executed test cases to dynamically evaluate the value of unexecuted test cases to improve the overall testing of the product by identifying cross-feature test cases in a real-time testing framework, dynamically match test case execution to a tester's workload, provide a system for scheduling unexecuted test cases and assigning them to testers in an environment where the workload may change dynamically based on failures/bugs that occur during testing, or customer issues that arise, evaluate both the tester's workload and the tester's expertise to ensure that highly skilled testers are available to schedule execution of complex test cases, identify unexecuted test cases that have similarity with high value executed test cases so as to identify high quality product failures/bugs as early in the testing process as possible, dynamically predict the value of unexecuted test cases by learning from executed test cases based on test case similarity and the failures detected by the executed test cases, and assign test cases with a higher priority as early in a test cycle as possible.

In contrast to conventional technologies, in at least some implementations in accordance with the current technique as described herein, test case execution scheduling and coverage is optimized by selecting an unexecuted test case from a plurality of test cases in a software testing lifecycle system. The test case execution system calculates a weighted metric associated with a tester for each tester in a plurality of testers. Using the weighted metric, the test case execution system determines a tester to which to assign the unexecuted test case for execution, where a tester is associated with a tester system. The test case execution system assigns the unexecuted test case to the tester. The test case execution system receives results associated with executing the unexecuted test case on the tester system resulting in an executed test case. The test case execution system determines a test case execution value for the executed test case based on test failures associated with the executed test case.

In an example embodiment of the current technique, for each unexecuted test case in the plurality of test cases, the test case execution system repeats the steps of selecting, calculating, determining, assigning, and receiving.

In an example embodiment of the current technique, prior to repeating the steps of selecting, calculating, determining, assigning, and receiving, the test case execution system updates the test case execution value for each executed test in the plurality of test cases.

In an example embodiment of the current technique, the test case execution system optimizes scheduling the unexecuted test case execution by tuning the weighted metric to balance the tester's workload and skill level.

In an example embodiment of the current technique, the test case execution system determines a predicted failure generation value associated with the unexecuted test case.

In an example embodiment of the current technique, the test case execution system determines a similarity between the unexecuted test case and an executed test case.

In an example embodiment of the current technique, the test case execution system determines a Euclidean Distance between the unexecuted test case and the executed test case.

In an example embodiment of the current technique, the test case execution system calculates the predicted failure generation value using the test case execution value associated with the executed test case, where the test execution value comprises a weighted test failure severity associated with the executed test case and test failures associated with the executed test case.

In an example embodiment of the current technique, the test case execution system selects the unexecuted test case with a maximum predicted failure generation value from the plurality of test cases.

In an example embodiment of the current technique, the test case execution system determines a subset of the plurality of test cases has a maximum predicted failure generation value, and randomly selects a random test case from the subset of the plurality of test cases as the test case.

In an example embodiment of the current technique, the test case execution system ranks ra plurality of unexecuted test cases according to a respective priority associated with each of the plurality of unexecuted test cases.

In an example embodiment of the current technique, each test case comprises an attribute set comprising at least one of a test case tag identifying features tested by the test case, tester skilled to execute the test case, priority of execution of the test case, failures detected by the test case, and test case configuration.

In an example embodiment of the current technique, the test case execution system determines an extent to which a test case feature is covered within a test case.

In an example embodiment of the current technique, the test case execution system determines an extent to which a tester is skilled to test the test case features.

In an example embodiment of the current technique, the weighted metric comprises a tester workload metric, and a tester skill metric.

In an example embodiment of the current technique, the weighted metric comprises weighting each of the tester workload metric, and the tester skill metric.

In an example embodiment of the current technique, the test case execution system selects a tester with a minimum weighted metric from a plurality of testers.

FIG. 1 shows a computer network (also referred to herein as an information processing system) 100 configured in accordance with an illustrative embodiment. The computer network 100 comprises a software testing life cycle system 101, test case execution system 105, tester systems 102-N, and test system 103. The software testing life cycle system 101, test case execution system 105, tester systems 102-N, and test system 103 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a test case execution system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the test system 103 and tester systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The test system 103 and tester systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the test case execution system 105 are one or more input-output devices, which illustratively comprise keyboards, displays or other types of input-output devices in any combination. Such input-output devices can be used, for example, to support one or more user interfaces to the test case execution system 105, as well as to support communication between the test case execution system 105 and other related systems and devices not explicitly shown. For example, a dashboard may be provided for a user to view a progression of the execution of the test case execution system 105. One or more input-output devices may also be associated with any of the test system 103 and tester systems 102-N.

Additionally, the test case execution system 105 in the FIG. 1 embodiment is assumed to be implemented using at least one processing device. Each such processing device generally comprises at least one processor and an associated memory, and implements one or more functional modules for controlling certain features of the test case execution system 105.

More particularly, the test case execution system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the test case execution system 105 to communicate over the network 104 with the software testing life cycle system 101, test system 103, and tester systems 102-N and illustratively comprises one or more conventional transceivers.

A test case execution system 105 may be implemented at least in part in the form of software that is stored in memory and executed by a processor, and may reside in any processing device. The test case execution system 105 may be a standalone plugin that may be included within a processing device.

It is to be understood that the particular set of elements shown in FIG. 1 for test case execution system 105 involving the software testing life cycle system 101, test system 103, and tester systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the test case execution system 105 can be on and/or part of the same processing platform.

An exemplary process of test case execution system 105 in computer network 100 will be described in more detail with reference to, for example, the flow diagram of FIG. 2.

Figure 2:
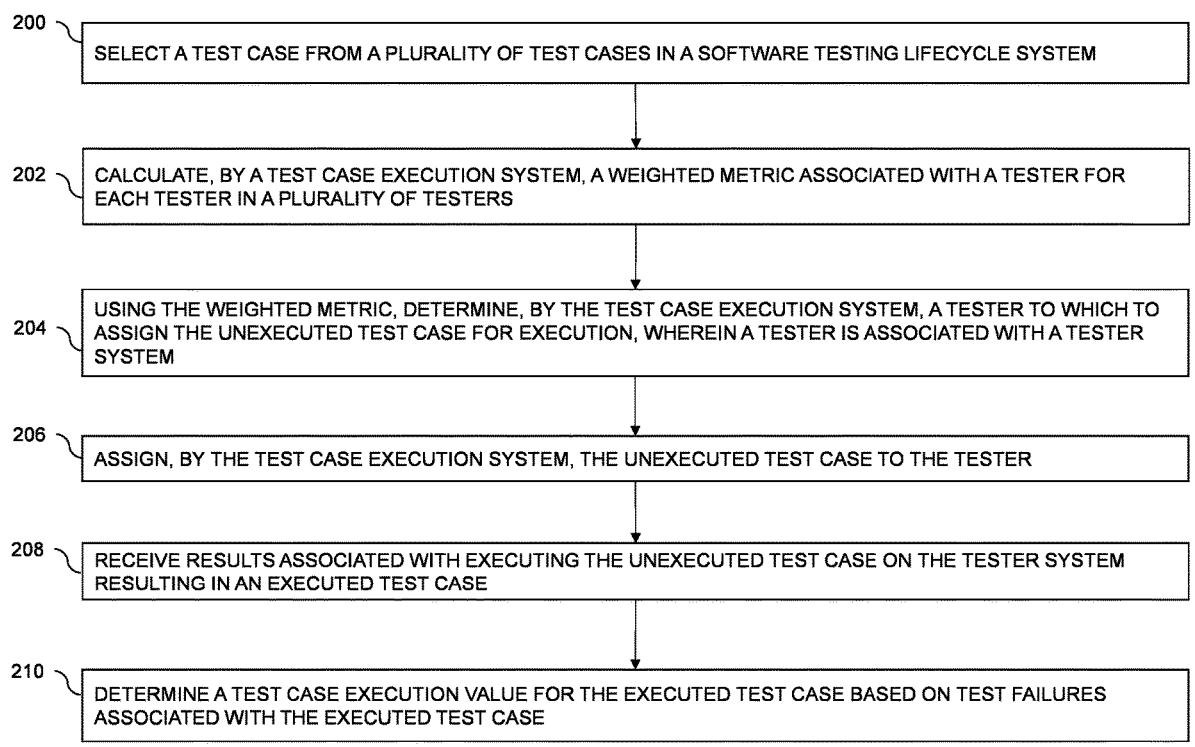
FIG. 2 shows a flow diagram of a process for a test case execution system in an illustrative embodiment.

FIG. 2 is a flow diagram of a process for execution of the test case execution system 105 in an illustrative embodiment. It is to be understood that this particular process is only an example, and additional or alternative processes can be carried out in other embodiments.

In an example embodiment, each test case comprises an attribute set comprising at least one of a test case tag identifying features (identified as feature tags) tested by the test case, tester skilled to execute the test case, priority of execution of the test case, failures detected by the test case, and test case configuration. A test case may have one or more feature tags indicating feature coverage of the test case. Feature tags are also associated with the expertise of a tester. A tester whose skills cover all the feature tags of the test case is a tester skilled to execute the test case, or a test case skilled tester. A tester's skilled feature tag represents the tester's skilled feature coverage. For example, one tester may be linked with one or more skilled feature tags. A test case may be linked with one or more skilled testers. Likewise, one tester may be linked with one or more test cases. If all the feature tags of a test case can be executed by a tester, that is a tester's skilled test case. In an example embodiment, a tester is responsible for executing the test case, and may be pre-defined prior to the case assignment plan. The priority of execution of the test case represents the test case's critical degree, or how early in the test process the test case should be executed to identify more product failures/bugs earlier in the test process, and to ensure test feature coverage occurring earlier during the testing process. In an example embodiment, the higher the test case's priority, the earlier the test case should be executed in the test process. In an example embodiment, three priority levels are defined for each test case; P1 represents the highest priority, P2 represents a medium priority, and P3 represents a lower priority. In an example embodiment, each test case may be associated with one or more priorities. The test case configuration represents the test case's configuration scale, such as the number of volumes, the number of file systems, the number of virtual machines, the number of disk types/tiers, etc. Usually, the test case configuration is defined before the test case design stage.

At 200, the test case execution system 105 selects a test case from a plurality of test cases in a software testing lifecycle system. In an example embodiment, a test case set, TC, is comprised of the plurality of test cases where each of the test cases is unexecuted. For example, if there are N test cases in the test case set (i.e., the unexecuted test case set), TC, then TC{test case$_1$, test case$_2$ . . . test case$_i$ . . . test case$_N$}. In an example embodiment each test case comprises an attribute set comprising at least one of a test case tag identifying features tested by the test case, tester skilled to execute the test case, priority of execution of the test case, failures detected by the test case, and test case configuration.

In an example embodiment, the test case execution system 105 determines a predicted failure generation value associated with the unexecuted test case. The predicted failure generation value represents the test case's potential ability to generate a failure/bug during the execution of the test case. The higher the value, the higher the probability that the test case can trigger a high quality product failure/bug.

In an example embodiment, the test case execution system 105 determines an extent to which a test case feature is covered within a test case, defined as $\gamma_{case\ i, tag\ j}$. In an example embodiment, if $\gamma_{case\ i, tag\ j}=1$, then test case i is linked with feature tag j. Conversely, if $\gamma_{case\ i, tag\ j}=0$, then test case i is not linked with feature tag j.

In an example embodiment, the test case execution system 105 determines an extent to which a tester is skilled to test the test case features, defined as $\gamma_{tester\ i, tag\ j}$. In an example embodiment, if $\gamma_{tester\ i, tag\ j}=1$, then the tester i is skilled in testing feature tag j. Conversely, if $\gamma_{tester\ i, tag\ j}=0$, then tester i is skilled in testing feature tag j.

In an example embodiment, there are severity levels associated with each bug/failure. For example, there may be 3 severity levels, critical, high, and low. The critical bug level represents bugs/failures that have a critical impact on product quality. In an example embodiment, a critical bug level is assigned a weight of 0.6. The high bug level represents bugs/failures that have a high impact on product quality. In an example embodiment, a high bug level is assigned a weight of 0.3. The low bug level represents bugs/failures that have a low impact on product quality. In an example embodiment, a low bug level is assigned a weight of 0.1. The severity level j of bugs/failures generated by case i may be represented by $Bug_{case\ i, level\ j}$.

In an example embodiment, the value of an executed test case i is represented as $V_{case\ i}$. In an example embodiment, the test case execution value, $V_{case\ i}$ represents the executed test case's ability to generate a failure/bug. The more failures/bugs the test case identifies when executed, the higher the value. The value of an executed test case equals the sum of test case linked failures/bugs multiplied by the corresponding severity level of the bug weights. For example, $V_{case\ i}$ is defined as:

$$V_{case\ i} = \sum_{all\ case\ i\ linked\ bugs} \omega_{level\ j} \cdot Bug_{case\ i, level\ j}$$

In an example embodiment, the configuration item j's value of test case i is defined as $C_{case\ i, cfg\ j}$.

In an example embodiment, the test case execution system 105 determines a similarity $S_{case\ i, case\ j}$ between the unexecuted test case and an executed test case. An unexecuted test case that has a high similarity with a known high value executed test case will have more potential value to be scheduled to execute ahead of another unexecuted test case with the same priority. For example, the test case execution system 105 determines a Euclidean Distance between the unexecuted test case j and the executed test case i against all configuration items:

$$S_{case\ i, case\ j} = \sqrt{\sum_{all\ cfgs} (C_{case\ i, cfg\ j} - C_{case\ j, cfg\ j})^2}$$

As noted above, the predicted failure generation value represents the test case's potential ability to generate a failure/bug during the execution of the test case. In an example embodiment, for unexecuted test cases, the value may be predicted by the unexecuted test case's similarity to executed test cases. In an example embodiment, the test case similarity represents the configuration coverage similarity between the two cases' configuration coverage similarity. The predicted failure generation value, $PredV_{case\ j}$, equals the sum of the test case execution values of executed test cases multiplied by the corresponding similarity weights.

The test case execution system 105 calculates the predicted failure generation value using the test case execution value associated with the executed test case, where the test execution value comprises a weighted test failure severity associated with the executed test case and test failures associated with the executed test case. The predicted failure generation value is represented as:

$$PredV_{case\,j} = \sum_{case\,i \in all\,already-run\,cases} \frac{S_{case\,i,case\,j}}{\sum_{case\,i \in all\,already-run\,cases} S_{case\,i,case\,j}} \cdot V_{case\,i}$$

In an example embodiment, the test case execution system 105 selects the unexecuted test case with the maximum predicted failure generation value from the plurality of test cases. In an example embodiment, the test case execution system 105 ranks the unexecuted test cases in the plurality of test cases by each test case's priority, and then defines the test cases with the highest priority as "selectable test cases". The test case execution system 105 updates the value $V_{case}$ for each of the executed test cases according to the latest linked bugs (i.e., those bugs/failures that were generated during execution of the test cases). The test case execution system 105 then calculates the predicted failure generation value for each unexecuted test case in the group of the "selectable test cases", and selects the test case with the maximum $PredV_{case}$ as the next test case to be assigned to a tester. In other words, at 200, when the test case execution system 105 selects a test case from a plurality of test cases in a software testing lifecycle system, the test case execution system 105 selects the test case with the maximum $PredV_{case}$ as the selected test case.

In an example embodiment, the test case execution system 105 determines a subset of the plurality of test cases has a maximum predicted failure generation value, and randomly selects a random test case from the subset of the plurality of test cases as the test case. In other words, if there are multiple unexecuted test cases that have the same maximum $PredV_{case}$, the test case execution system 105 randomly selects a case (from those unexecuted test cases that all have the maximum $PredV_{case}$) as the selected test case.

At 202, the test case execution system 105 calculates a weighted metric associated with a tester for each tester in a plurality of testers. In an example embodiment, the weighted metric comprises a tester workload metric, and a tester skill metric. In an example embodiment, the tester's workload comprises the test case execution time and the time spent on other tasks. In an example embodiment, the tester's workload is measured by the tester's total task execution time planned during a given test execution period. In an example embodiment, the tester workload metric, $T_{tester\,i}$ represents the sum of execution time of a tester that has been planned within a given testing execution period. In an example embodiment, $T_{tester\,i}$ may be represented in units of "hours".

In an example embodiment, the tester skill metric, $I_{tester\,i}$ represents an expertise associated with a tester with respect to the remaining unexecuted test cases within the plurality of test cases. The tester's expertise on unexecuted test cases is measured by the test case count of those unexecuted test cases that the tester is skilled to execute. The higher the tester's expertise, the more test cases are impacted when the tester is assigned to run one or more of the unexecuted test cases. In an example embodiment, $I_{tester\,i}$ may be represented as the number of unexecuted test cases that the tester is skilled in to execute. In an example embodiment, the weighted metric, P, comprises weighting each of the tester workload metric, and the tester skill metric, and is represented as:

$$P = \omega_T \cdot T + \omega_I \cdot I$$

The variables $\omega_T$ and $\omega_I$, stand for the weights of the tester workload metric, and the tester skill metric, and $\omega_T + \omega_I = 1$. In an example embodiment, the scheduling of the unexecuted test cases can be optimized by tuning the weighted metric to balance the tester's workload and skill level.

At 204, using the weighted metric, the test case execution system 105 determines a tester (associated with a tester system 102-N) to which to assign the unexecuted test case for execution, and at 206, the test case execution system 105 assigns the unexecuted test case to the tester. In an example embodiment, for the test case selected at 200, the test case execution system 105 calculates the weighted metric as follows:

$$P = \omega_T \cdot \frac{T_{tester\,j}}{\sum_{tester\,j \in case\,i\,skilled\,testers} T_{tester\,j}} + \omega_I \cdot \frac{I_{tester\,j}}{\sum_{tester\,j \in case\,i\,skilled\,testers} I_{tester\,j}}$$

In an example embodiment, for a given unexecuted test case, the skilled tester with the lighter workload is preferred as the selected tester so as to achieve workload balance among the testers.

In an example embodiment, for a given unexecuted test case, the skilled tester with less expertise to other skilled testers is preferred to be selected to execute test cases first so that the skilled testers with more expertise are available to be scheduled for more complex test cases, for example, those unexecuted test cases with more feature tags and larger scale configurations, and also to ensure that more unexecuted test cases may be executed in parallel.

In an example embodiment, the test case execution system 105 calculates the weighted metric for a plurality of testers, and selects the tester with the minimum weighted criterion P.

At 208, the test case execution system 105 receives results associated with executing the unexecuted test case on the tester system 102-N, which results in an executed test case. In an example embodiment, the software testing life cycle system 101 receives the results associated with executing the unexecuted test case on the tester system 102-N. In an example embodiment, the results are the bugs/failures that occurred during the test case execution. As noted above, there are severity levels associated with each bug/failure. The severity level j of bugs/failures generated by a test case i is represented by $Bug_{case\,i,level\,j}$. The value of an executed test case i is represented as $V_{case\,i}$, and is calculated using $Bug_{case\,i,level\,j}$.

In an example embodiment, the test case execution system 105 assesses whether there are any unexecuted test cases in the plurality of test cases. For each unexecuted test case in the plurality of test cases, the test case execution system 105 repeats the steps of selecting, calculating, determining, assigning, and receiving. In an example embodiment, once the test case execution system 105 determines that all unexecuted test cases have been executed, the test case execution system 105 ceases assigning and scheduling execution of the test cases in the plurality of test cases.

At 210, the test case execution system 105 determines a test case execution value $V_{case\,i}$ for the executed test case based on test failures associated with the executed test case. In an example embodiment, prior to repeating the steps of selecting, calculating, determining, assigning, and receiving, the test case execution system 105 updates the test case execution value, $V_{case\ i}$ for each executed test in the plurality of test cases. Thus, once the test case execution system 105 assigns the unexecuted test case to a tester, the test case execution system 105 checks if all test cases are executed. If not, the test case execution system 105 ranks the current set of unexecuted test cases by priority, identifies the unexecuted test cases with the highest priority, and then updates the $V_{case\ i}$ for the executed test cases in the plurality of test cases.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve test case execution scheduling balance. These and other embodiments can effectively improve and maximize the testing effectiveness and efficiency to reach the end goal of presenting the optimal product to the customer. Embodiments disclosed herein provide optimal balance when assigning test cases to testers. Embodiments disclosed herein dynamically schedule execution of test cases that have the potential to generate critical failures/bugs earlier in the testing phase. Embodiments disclosed herein analyze executed test cases to dynamically evaluate the value of unexecuted test cases to improve the overall testing of the product by identifying cross-feature test cases in a real-time testing framework. Embodiments disclosed herein dynamically match test case execution to a tester's workload. Embodiments disclosed herein provide a system for scheduling unexecuted test cases and assigning them to testers in an environment where the workload may change dynamically based on failures/bugs that occur during testing, or customer issues that arise. Embodiments disclosed herein evaluate both the tester's workload and the tester's expertise to ensure that highly skilled testers are available for scheduling execution of complex test cases. Embodiments disclosed herein identify unexecuted test cases that have similarity with high value executed test cases so as to identify high quality product failures/bugs as early in the testing process as possible. Embodiments disclosed herein dynamically predict the value of unexecuted test cases by learning from executed test cases based on test case similarity and the failures detected by the executed test cases, and assign test cases with a higher priority as early in a test cycle as possible.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 3 and 4. Although described in the context of the information processing system 100, these platforms may also be used to implement at least portions of other information processing systems in other embodiments.

Figure 3:
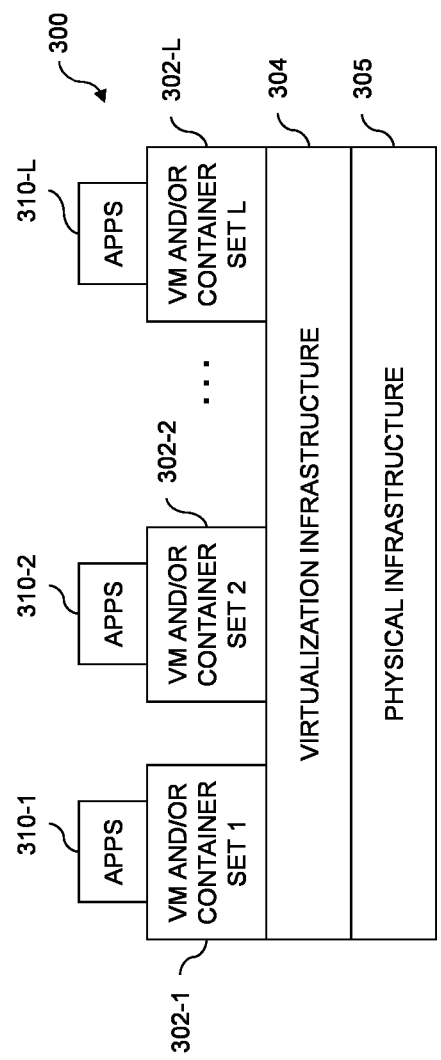
FIGS. 3 and 4 show examples of processing platforms that may be utilized to implement at least a portion of a test case execution system embodiments.
Figure 4:
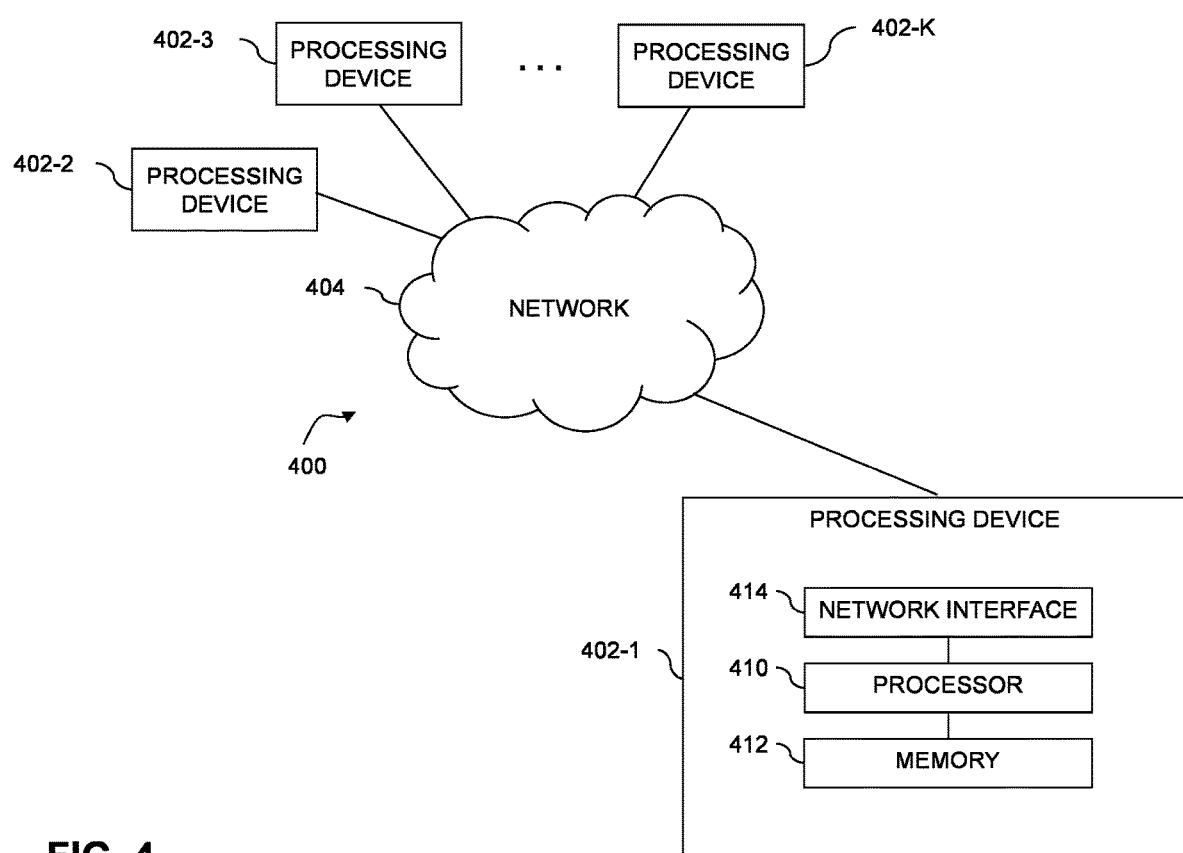

FIG. 3 shows an example processing platform comprising cloud infrastructure 300. The cloud infrastructure 300 comprises a combination of physical and virtual processing resources that are utilized to implement at least a portion of the information processing system 100. The cloud infrastructure 300 comprises multiple virtual machines (VMs) and/or container sets 302-1, 302-2, . . . 302-L implemented using virtualization infrastructure 304. The virtualization infrastructure 304 runs on physical infrastructure 305, and illustratively comprises one or more hypervisors and/or operating system level virtualization infrastructure. The operating system level virtualization infrastructure illustratively comprises kernel control groups of a Linux operating system or other type of operating system.

The cloud infrastructure 300 further comprises sets of applications 310-1, 310-2, . . . 310-L running on respective ones of the VMs/container sets 302-1, 302-2, . . . 302-L under the control of the virtualization infrastructure 304. The VMs/container sets 302 comprise respective VMs, respective sets of one or more containers, or respective sets of one or more containers running in VMs. In some implementations of the FIG. 3 embodiment, the VMs/container sets 302 comprise respective VMs implemented using virtualization infrastructure 304 that comprises at least one hypervisor.

A hypervisor platform may be used to implement a hypervisor within the virtualization infrastructure 304, where the hypervisor platform has an associated virtual infrastructure management system. The underlying physical machines comprise one or more distributed processing platforms that include one or more storage systems.

In other implementations of the FIG. 3 embodiment, the VMs/container sets 302 comprise respective containers implemented using virtualization infrastructure 304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the information processing system 100 and includes a plurality of processing devices, denoted 402-1, 402-2, 402-3, . . . 402-K, which communicate with one another over a network 404.

The network 404 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 402-1 in the processing platform 400 comprises a processor 410 coupled to a memory 412.

The processor 410 comprises a microprocessor, a microcontroller, an application-specific integrated circuit (ASIC), a field-programmable gate array (FPGA) or other type of processing circuitry, as well as portions or combinations of such circuitry elements.

The memory 412 comprises random access memory (RAM), read-only memory (ROM) or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
 selecting an unexecuted test case from a plurality of test cases in a software testing lifecycle system;
 calculating, by a test case execution system, a weighted metric associated with a tester for each tester in a plurality of testers, the weighted metric comprising total task execution time planned within a testing period and expertise with respect to remaining unexecuted test cases;
 using the weighted metric, determining, by the test case execution system, a tester to which to assign the unexecuted test case for execution, wherein a tester is associated with a tester system;
 assigning, by the test case execution system, the unexecuted test case to the tester;
 receiving results associated with executing the unexecuted test case on the tester system resulting in an executed test case; and
 determining a test case execution value for the executed test case based on test failures associated with the executed test case, wherein the method is implemented by at least one processing device comprising a processor coupled to a memory.

2. The method of claim 1 further comprising:
 for each unexecuted test case in the plurality of test cases:
  repeating steps of selecting, calculating, determining, assigning, and receiving.

3. The method of claim 2 further comprising:
 prior to the repeating the steps of selecting, calculating, determining, assigning, and receiving, updating the test case execution value for each executed test in the plurality of test cases.

4. The method of claim 1 further comprising:
 optimizing scheduling the unexecuted test case execution by tuning the weighted metric to balance the tester's workload and skill level.

5. The method of claim 1 wherein selecting an unexecuted test case from a plurality of test cases comprises:
 determining a predicted failure generation value associated with the unexecuted test case.

6. The method of claim 5 wherein determining the predicted failure generation value associated with the unexecuted test case comprises:
 determining a similarity between the unexecuted test case and an executed test case.

7. The method of claim 6 wherein determining the similarity comprises:
 determining a Euclidean Distance between the unexecuted test case and the executed test case.

8. The method of claim 5 wherein determining the predicted failure generation value associated with the unexecuted test case comprises:
 calculating the predicted failure generation value using the test case execution value associated with the executed test case, wherein the test execution value comprises a weighted test failure severity associated with the executed test case and test failures associated with the executed test case.

9. The method of claim 5 further comprising:
 selecting the unexecuted test case with a maximum predicted failure generation value from the plurality of test cases.

10. The method of claim 5 further comprising:
 determining a subset of the plurality of test cases has a maximum predicted failure generation value; and
 randomly selecting a random test case from the subset of the plurality of test cases as the test case.

11. The method of claim 1 wherein selecting an unexecuted test case from a plurality of test cases comprises:
 determining an extent to which a test case feature is covered within a test case.

12. The method of claim 1 wherein calculating, by the test case execution system, the weighted metric comprises:
 determining an extent to which a tester is skilled to test the test case features.

13. The method of claim 1 wherein calculating, by the test case execution system, the weighted metric comprises:
 ranking a plurality of unexecuted test cases according to a respective priority associated with each of the plurality of unexecuted test cases.

14. The method of claim 1 wherein each test case comprises an attribute set comprising at least one of a test case tag identifying features tested by the test case, tester skilled to execute the test case, priority of execution of the test case, failures detected by the test case, and test case configuration.

15. The method of claim 1 wherein the weighted metric comprises a tester workload metric representing a sum of the total task execution time planned within the testing period, and a tester skill metric representing the expertise with respect to the remaining unexecuted test cases.

16. The method of claim 15 wherein the weighted metric comprises weighting each of the tester workload metric, and the tester skill metric.

17. The method of claim 1 wherein determining, by the test case execution system, a tester to which to assign the test case comprises:
 selecting a tester with a minimum weighted metric from a plurality of testers.

18. A system comprising:
 at least one processing device comprising a processor coupled to a memory;
 the at least one processing device being configured:
  to select an unexecuted test case from a plurality of test cases in a software testing lifecycle system;
  to calculate, by a test case execution system, a weighted metric associated with a tester for each tester in a plurality of testers, the weighted metric comprising total task execution time planned within a testing period and expertise with respect to remaining unexecuted test cases;
  using the weighted metric, to determine, by the test case execution system, a tester to which to assign the unexecuted test case for execution, wherein a tester is associated with a tester system;
  to assign, by the test case execution system, the unexecuted test case to the tester;
  to receive results associated with executing the unexecuted test case on the tester system resulting in an executed test case; and
  to determine a test case execution value for the executed test case based on test failures associated with the executed test case.

19. The system of claim 18 further comprising:
 updating the test case execution value for each executed test in the plurality of test cases; and
 for each unexecuted test case in the plurality of test cases:
  repeating steps of selecting, calculating, determining, assigning, and receiving.

20. A computer program product comprising a non-transitory processor-readable storage medium having stored therein program code of one or more software programs, wherein the program code when executed by at least one processing device causes said at least one processing device:
to select an unexecuted test case from a plurality of test cases in a software testing lifecycle system;
to calculate, by a test case execution system, a weighted metric associated with a tester for each tester in a plurality of testers, the weighted metric comprising total task execution time planned within a testing period and expertise with respect to remaining unexecuted test cases;
using the weighted metric, to determine, by the test case execution system, a tester to which to assign the unexecuted test case for execution, wherein a tester is associated with a tester system;
to assign, by the test case execution system, the unexecuted test case to the tester;
to receive results associated with executing the unexecuted test case on the tester system resulting in an executed test case; and
to determine a test case execution value for the executed test case based on test failures associated with the executed test case.

* * * * *